United States Patent
Gao et al.

(10) Patent No.: US 8,386,937 B1
(45) Date of Patent: Feb. 26, 2013

(54) SYSTEM, APPARATUS, AND METHOD FOR FILTERING NETWORK CONFIGURATION INFORMATION

(75) Inventors: Lingping Gao, Lexington, MA (US); Guangdong Liao, Mississauga (CA)

(73) Assignee: NetBrain Technologies Inc., Burlington, MA (US)

( * ) Notice: Subject to any disclaimer, the term of this patent is extended or adjusted under 35 U.S.C. 154(b) by 718 days.

(21) Appl. No.: 12/510,467

(22) Filed: Jul. 28, 2009

Related U.S. Application Data

(63) Continuation-in-part of application No. 12/505,432, filed on Jul. 17, 2009.

(60) Provisional application No. 61/083,995, filed on Jul. 28, 2008, provisional application No. 61/081,624, filed on Jul. 17, 2008, provisional application No. 61/081,652, filed on Jul. 17, 2008.

(51) Int. Cl.
*G06F 15/177* (2006.01)

(52) U.S. Cl. .................. 715/736; 715/734; 715/735

(58) Field of Classification Search ........... 715/733–740
See application file for complete search history.

(56) References Cited

U.S. PATENT DOCUMENTS

| | | | | |
|---|---|---|---|---|
| 5,276,789 A | 1/1994 | Besaw et al. | ............... | 395/140 |
| 5,504,921 A | 4/1996 | Dev et al. | ............... | 395/800 |
| 5,572,640 A | 11/1996 | Schettler | ............... | 395/140 |
| 6,058,103 A | 5/2000 | Henderson et al. | ........... | 370/254 |
| 6,137,782 A | 10/2000 | Sharon et al. | ........... | 370/255 |
| 6,151,031 A | 11/2000 | Atkins et al. | ........... | 345/441 |
| 6,205,122 B1 | 3/2001 | Sharon et al. | ........... | 370/254 |
| 6,253,240 B1 | 6/2001 | Axberg et al. | ........... | 709/223 |
| 6,289,380 B1 | 9/2001 | Battat et al. | ........... | 709/224 |
| 6,477,572 B1 | 11/2002 | Elderton et al. | ........... | 709/224 |
| 6,628,304 B2 | 9/2003 | Mitchell et al. | ........... | 345/734 |
| 6,718,382 B1 | 4/2004 | Li et al. | ........... | 709/224 |
| 6,907,572 B2 * | 6/2005 | Little et al. | ........... | 715/762 |
| 6,957,263 B2 | 10/2005 | Galou et al. | ........... | 709/227 |
| 7,054,901 B2 * | 5/2006 | Shafer | ........... | 709/203 |
| 7,376,719 B1 * | 5/2008 | Shafer et al. | ........... | 709/220 |
| 7,469,139 B2 | 12/2008 | van de Groenendaal | ..... | 455/411 |
| 7,590,718 B2 | 9/2009 | Gilmour et al. | ........... | 709/223 |
| 7,765,320 B2 * | 7/2010 | Vehse et al. | ........... | 709/238 |
| 7,813,281 B2 | 10/2010 | Bolt et al. | ........... | 370/231 |
| 7,823,069 B1 * | 10/2010 | Tanner et al. | ........... | 715/745 |
| 7,996,415 B1 * | 8/2011 | Raffill et al. | ........... | 707/758 |
| 2002/0161861 A1 * | 10/2002 | Greuel | ........... | 709/220 |
| 2002/0198974 A1 * | 12/2002 | Shafer | ........... | 709/223 |
| 2006/0015591 A1 * | 1/2006 | Datla et al. | ........... | 709/220 |
| 2007/0058570 A1 | 3/2007 | Singh et al. | ........... | 370/254 |
| 2008/0120129 A1 | 5/2008 | Seubert et al. | ........... | 705/1 |
| 2008/0155423 A1 * | 6/2008 | Moran et al. | ........... | 715/736 |
| 2009/0094521 A1 * | 4/2009 | Hung et al. | ........... | 715/736 |
| 2010/0023867 A1 * | 1/2010 | Coldiron et al. | ........... | 715/736 |
| 2010/0122175 A1 * | 5/2010 | Gupta et al. | ........... | 715/735 |

OTHER PUBLICATIONS

United States Patent and Trademark Office, Office Action, dated Apr. 2, 2012, U.S. Appl. No. 12/505,432, 24 pages.
Cisco Systems, Inc., "Show Command Section Filter," Cisco IOS Release 12.3(2)T, 6 pages, 2003.

* cited by examiner

*Primary Examiner* — Weilun Lo
*Assistant Examiner* — Enrique Iturralde
(74) *Attorney, Agent, or Firm* — Sunstein Kann Murphy & Timbers LLP

(57) ABSTRACT

Methods to match certain context of commands directed to a network technology or a network design from configuration files and a user interface to display these results. A language with the simple syntax similar to the human language is provided. The language includes rules to define the parameter and syntax for the parameter operations and also standard functions to parse commands. A script file can be conveniently written in this language to filter the desired contexts from a configuration file. In the exemplary embodiment, the system translates the script file to an executable standard Perl programming and Perl programming is run with the configuration file as the input. The result is displayed in the graphic user interface, which is designed to work with an interactive network topology map.

24 Claims, 10 Drawing Sheets

```
result1 = Search_Paragraph("^router eigrp", "", "network", all);     ——— 310 result2 = Search_Line("^network", all, #result1);     ——— 320
result3 = Search_Line("^router eigrp", all, #result1);     ——— 330 result4 = #result3 + #result2;     ——— 340
print #result4;                      ——— 350
```

```
902  #result1 = Search_Paragraph("^interface","","ip access-group", all);
904  #InterfaceCmd = Search_Line("^interface",all,#result1);
906  #AccessGroup = Search_Line("^ip access-group ($acl)",all,#result1);
908  #result2 = Search_Line("^access-list $acl",continuous);
910  #result3 = Search_Paragraph("^ip access-list " $acl," "," ", first);
912  #result4 = #InterfaceCmd + #AccessGroup;
914  print #result4;
916  print #result2;
918  print #result3;
```

FIG. 9

SYSTEM, APPARATUS, AND METHOD FOR FILTERING NETWORK CONFIGURATION INFORMATION

CROSS-REFERENCE TO RELATED APPLICATION(S)

This patent application is a continuation-in-part of, and therefore claims priority from, co-owned U.S. patent application Ser. No. 12/505,432 entitled COMPUTER AIDED NETWORK ENGINEERING SYSTEM, APPARATUS, AND METHOD filed on Jul. 17, 2009, which claims the benefit of U.S. Provisional Patent Application No. 61/081,624 entitled NETWORK MANAGEMENT SYSTEM AND METHOD filed on Jul. 17, 2008 and also claims the benefit of U.S. Provisional Patent Application No. 61/081,652 entitled NETWORK MANAGEMENT SYSTEM AND METHOD filed on Jul. 17, 2008.

This patent application also claims the benefit of U.S. Provisional Patent Application No. 61/083,995 entitled METHOD TO MATCH AND DISPLAY NETWORK CONFIGURATIONS FOR A NETWORK TECHNOLOGY OR DESIGN filed on Jul. 28, 2008.

Each of the above-referenced patent applications is hereby incorporated herein by reference in its entirety.

FIELD OF THE INVENTION

The present invention is directed to the field of the network management, in particular to the network management system to help network professionals to understand the network technology.

BACKGROUND OF THE INVENTION

Network devices such as routers and switches typically include an interface through which a user (e.g., a network manager) can obtain configuration and other types of information about the network device. One well-known network device interface is the command line interface (CLI) of the Cisco IOS operating system, which is run by most network devices made by Cisco Systems, Inc. Network devices provided by other vendors typically include similar network device interfaces.

For such network devices, the configuration state is typically represented by a text file, often referred to as the configuration file. The network device interface typically includes a command or other mechanism by which the user can obtain a copy of the configuration file. For example, in order to obtain the configuration file from a Cisco device, the user typically enters the "show run" command via the CLI. The configuration file is important to the network manager, since it reflects the operational configuration of the network device, which may be different than the original configuration of the network device, for example, due to configuration changes made to the device (e.g., through the CLI, through SNMP, or otherwise). Therefore, a network manager generally must know how to read the configuration file.

In practice, it can be very difficult for the user to read and understand the configuration file because configuration files can be quite large and can be quite complex. For example, a configuration file can be many pages long and can be divided into hierarchical contexts, with each context including a set of specified commands that typically corresponds with a certain network technology, such as routing protocols, access lists and multi-castings. Within the configuration file, one command line may refer to other command lines located in distant parts of the configuration file, making it difficult for the user to find the desired context. Also, because network technology evolves quickly and most users are only expert in some fields and may have difficulty catching up with technologies in other fields, it may be difficult for the user to find and understand the context of certain commands that do not fall within the area of expertise. Furthermore, a network professional often reads and compares a context of configurations for more than one network devices, which is hard to do via the CLI.

The Cisco IOS CLI allows the user to specify some rudimentary filtering parameters when running the "show run" command in order to limit the amount of information displayed. For example, the user can specify an "include" filter to display only command lines that include a specified expression (text string) or can specify an "exclude" filter to display only command lines that do not include a specified expression. Such filtering is described, for example, in a document published by Cisco Systems, Inc. entitled Show Command Section Filter for Cisco IOS Release 12.3(2)T dated 2003, which is hereby incorporated herein by reference in its entirety.

SUMMARY OF THE INVENTION

In accordance with one aspect of the invention there is provided a method of filtering network device configuration files by a network management system. The method involves storing a set of design filters in a storage device; receiving, via a graphical user interface, user input identifying a selected design filter from among the set of design filters and selecting at least one network device configuration file; applying the selected design filter to the at least one selected network device configuration file to produce filtered results; and providing the filtered results via the graphical user interface for display on a user display device.

In accordance with another aspect of the invention there is provided a network management system including a network manager; a storage device in which the network manager stores a set of design filters; a graphical user interface through which users interact with the network manager; and a network interface through which the network manager obtains information about network devices, the network manager configured to receive, via a graphical user interface, user input identifying a selected design filter from among the set of design filters and selecting at least one network device configuration file; apply the selected design filter to the at least one selected network device configuration file to produce filtered results; and provide the filtered results via the graphical user interface for display on a user display device.

In various alternative embodiments, the selected design filter may be applied to a plurality of network device configuration files, in which case the filtered results may include filtered results for the plurality of network device configuration files. A screen having at least two windows may be provided, with each window including the filtered results associated with one of the plurality of network device configuration files. In such embodiments, the windows may be arranged side-by-side within the screen. In any case, the screen may include a graphical representation of at least one network element that is associated with the filtered results.

Additionally or alternatively, the selected design filter may be applied to a network device configuration file retrieved from the storage device and/or may be applied to a network device configuration file retrieved from the network device (e.g., by transmitting a request, such as a command line interface (CLI) command, to a network device via a network interface, receiving a network device configuration file from the network device in response to the request, and applying the selected design filter to the received network device configuration file).

Additionally or alternatively, the set of design filters may be stored in the storage device by providing at least one input screen via the graphical user interface; receiving a design filter script via the at least one input screen; converting the design filter script into an executable design filter; and storing at least one of the design filter script and the executable design filter in the storage device. The design filter script may include primitives for searching lines and paragraphs in the network device configuration file having specified attributes, and the executable design filter performs such searching when executed. In certain embodiments, the design filter script is converted into Perl. The executable design filter may be applied to the at least one network device configuration file.

Additionally or alternatively, the user input selecting the at least one network device configuration file may include a path associated with a stored network device configuration file or may include selection of at a network element from among a set of network elements presented via the graphical user interface. For example, the network element may represent a network device having an associated network device configuration file (e.g., a router or switch), and the selected design filter may be applied to such associated network device configuration file. Similarly, the network element may represent a logical component having a number of associated network devices (e.g., a LAN, WAN, or serial link) that have associated network device configuration files, and the selected design filter may be applied to each of such associated network device configuration files.

In accordance with another aspect of the invention there is provided a method of filtering network device configuration files by a network management system. The method involves storing a plurality of design filters in a storage device, the design filters specifying different filtering criteria; receiving, via a graphical user interface, a first user input identifying a first design filter from among the set of design filters; applying the first design filter to a network device configuration file to produce first filtered results; providing the first filtered results via the graphical user interface for display on a user display device; receiving, via the graphical user interface, a second user input identifying a second design filter from among the set of design filters; applying the second design filter to the network device configuration file to produce second filtered results; and providing the second filtered results via the graphical user interface for display on the user display device.

BRIEF DESCRIPTION OF THE DRAWINGS

The foregoing and advantages of the invention will be appreciated more fully from the following further description thereof with reference to the accompanying drawings wherein:

FIG. 9 shows a sample design filter for showing traffic filtering commands applied to an interface in the configuration file shown in FIG. 2, in accordance with an exemplary embodiment of the present invention.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Figure 1:
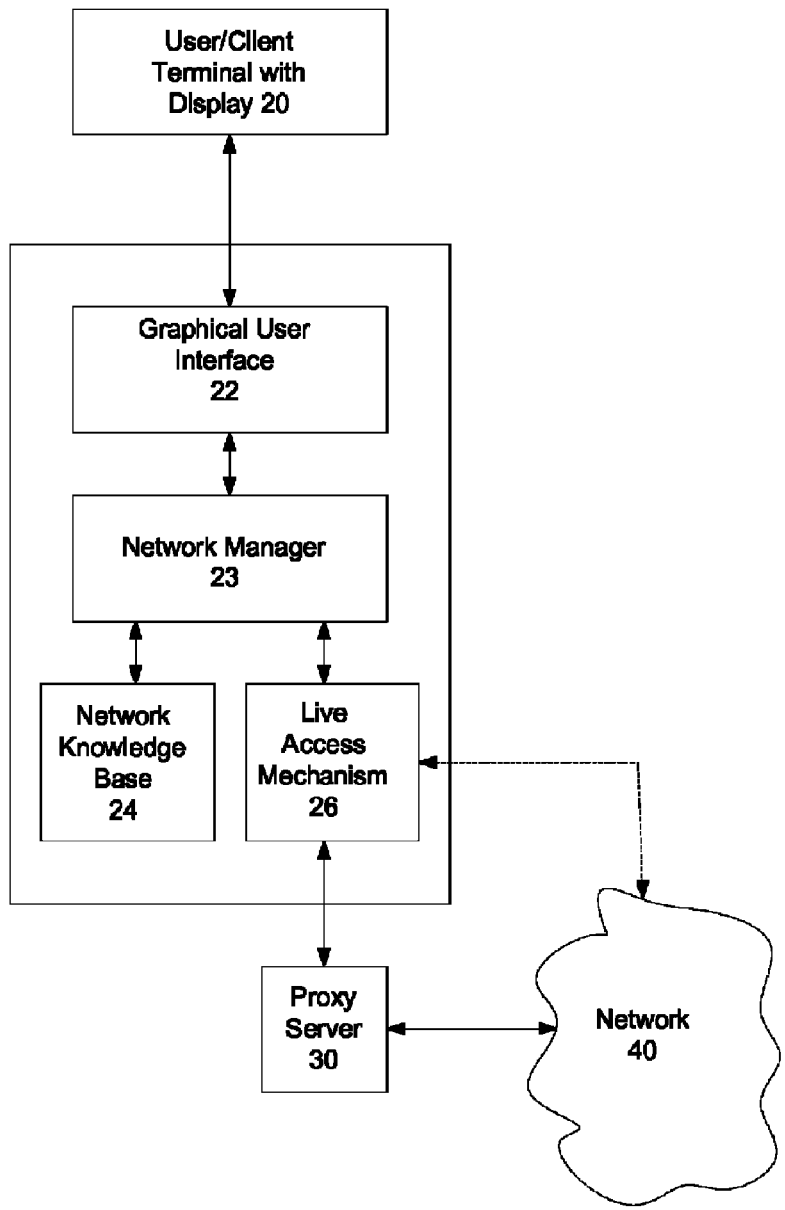
FIG. 1 is a schematic block diagram showing relevant components of a network management system, in accordance with an exemplary embodiment of the present invention.

Definitions. As used in this description and the accompanying claims, the following terms shall have the meanings indicated, unless the context otherwise requires:

A "set" includes one or more members.

A "storage device" is a device or system that is used to store data. A storage device may include one or more storage media such as, for example, magnetic or magneto-optical or optical disk drives, solid state storage devices, or magnetic tapes. A storage device may be locally or remotely accessed.

A "network element" is a physical or logical component associated with a network model. A typical network model includes various types of network elements such as, for example, various types of network devices (e.g., clients, servers, routers, switches, etc.) having various types of interfaces (e.g., ports, slots, etc.) and interconnected by various types of communication connections (e.g., serial links, LANs, WANs, VLANs, etc). Embodiments of the present invention utilize graphical (e.g., iconic) representations of network elements to depict physical and logical relationships within the network model at various levels (e.g., layer 2 or layer 3). The present invention is not limited to any particular type(s) of network elements.

A "configuration file" is collection of configuration data obtained from a network device. One example of a configuration file is the configuration data obtained from a network device running the Cisco IOS operating system in response to a "show run" command. Other types of network devices from other vendors may provide similar or different types of configuration files. The present invention is not limited to any particular type(s) of configuration files. Configuration files may be obtained from network devices, for example, using commands sent via the Simple Network Management Protocol (SNMP).

A "graphical user interface" or "GUI" is a user interface through which users interact with a computer system. Typically, a graphical user interface provides screens with at least some graphical representations that can be manipulated by the user, possibly along with text-based and other elements. A graphical user interface may be web-based.

In the context of a graphical user interface, a "window" or "panel" is an area of a screen in which information (e.g., icons, text, etc.) may be entered and/or displayed. A window may take up all or part of a screen. A screen may have multiple windows.

Embodiments of the present invention provide for filtering configuration file command lines based on user-specified filtering criteria and also provide a user interface to define such filters and display the filtered results. A language for defining such design filters is disclosed. The language includes rules to define parameters and syntax for parameter operations and also standard functions to parse command lines based on user-specified criteria. A script file can be conveniently written in this language to filter the desired contexts from a configuration file. In the exemplary embodiment, the system translates the script file to an executable standard Perl programming and Perl programming is run with the configuration file as the input. The result is displayed in the graphic user interface, which is designed to work with the network topology map.

Exemplary embodiments are described herein with reference to network devices that support the Cisco IOS operating system (and its CLI and configuration file format), although it should be noted that embodiments may support network devices from other vendors running the same or other operating systems and having the same of different CLIs.

FIG. 1 is a schematic block diagram showing relevant components of a network management system 10, in accordance with an exemplary embodiment of the present invention. Among other things, the network management system 10 includes a network manager 23 that communicates with a user/client terminal 20 via a graphical user interface 22 and communicates via a network interface 26 (referred to hereinafter as the "live access mechanism") with various types of network devices in the live network 40 directly or more frequently via a proxy server 30. Information about the network devices is stored in a storage device 24 (referred to hereinafter as the "network knowledge base"). In typical embodiments, the network management system 10 is server-based and the graphical user interface 22 includes a web-based user interface. The user/client terminal 20 may be directly connected to the network management system 10 or may communicate with the network management system 10 over a communication which may be the network 40 or may be a separate communication network (e.g., a local area network).

As is known in the art, the network manager 23 includes the capability to obtain configuration files from network devices (e.g., routers, switches, etc.) in the network 40, specifically by causing appropriate CLI commands to be sent to the network devices either directly or via the proxy server 30 using conventional mechanisms known in the art. The network manager 23 may be prompted to obtain configuration files, for example, via user inputs received from the user/client terminal 20 via the graphical user interface 22. Additionally or alternatively, the network manager 23 may obtain configuration files as part of various automated processes. In certain embodiments of the present invention, the network manager 23 includes interactive network mapping capabilities as discussed in the related application entitled COMPUTER AIDED NETWORK ENGINEERING SYSTEM, APPARATUS, AND METHOD incorporated by reference above, and the network manager 23 may be prompted to obtain one or more configuration files upon selection of a network component (e.g., a network device, a LAN or WAN segment, or a serial link depicted in an interactive network map provided by the network manager 23 to the user/client terminal 20 via the graphical user interface 22). It should be noted, however, that the present invention is not limited to network managers having such interactive mapping capabilities. The network manager 23 may store the configuration files in the network knowledge base 24 and/or may provide the configuration files for display on the user/client terminal 20.

Figure 2:
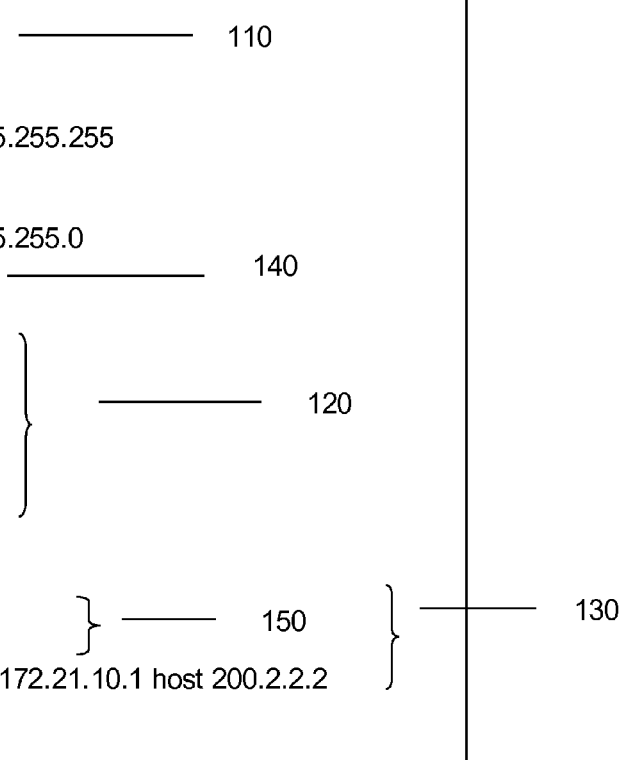
FIG. 2 shows a sample configuration file of a router running the Cisco IOS operating system, as known in the art.

FIG. 2 shows a sample configuration file of a router running the Cisco IOS operating system, as known in the art. The context of configurations related to a network technology or a network design can be: (1) a single line: for example, line 110 sets the router hostname; (2) a paragraph: for example, lines 120 configure EIGRP routing protocol and network professionals may be interested in the whole paragraph; (3) multiple lines: lines 130 are command lines to configure all access lists (ACL). More specifically, lines 150 include two lines to configure a single access list (access list 1). Furthermore, a command line may refer to other command lines located in other parts of a configuration file, and network professionals interested to the command line are quite possibly interested in those referenced commands. For example, in FIG. 2, command line 140 configures an ACL for the traffic flowing into the interface, and configurations for this ACL are further down in the configuration file at lines 150.

As discussed above, it can be very difficult for a user to read and understand the configuration file because configuration files can be quite large and can be quite complex. For example, a configuration file can be many pages long and can be divided into hierarchical contexts, with each context including a set of specified commands that typically corresponds with a certain network technology, such as routing protocols, access lists and multi-castings. Within the configuration file, one command line may refer to other command lines located in distant parts of the configuration file, making it difficult for the user to find the desired context. Also, because network technology evolves quickly and most users are only expert in some fields and may have difficulty catching up with technologies in other fields, it may be difficult for the user to find and understand the context of certain commands that do not fall within the area of expertise. Furthermore, a network professional often reads and compares a context of configurations for more than one network devices, which is hard to do via the CLI.

Therefore, embodiments of the present invention provide a simple but powerful set of configuration file filtering tools that the network professional can use to specify the types of network configuration information to be extracted from configuration files for display on the user/client terminal. Specifically, the user creates a design filter script using a predefined set of primitives. The network manager 23 compiles the design filter script into an executable design filter program and runs the executable design filter program on a specified configuration file provided to the design filter as a parameter at run time. The user may specify a configuration file path on which to run the design filter (e.g., a path to a configuration file stored in the network knowledge base 24) or may select a network device from which the configuration file is obtained. The network manager 23 may run the design filter at various times on configuration files for one or more network devices.

Figure 3:
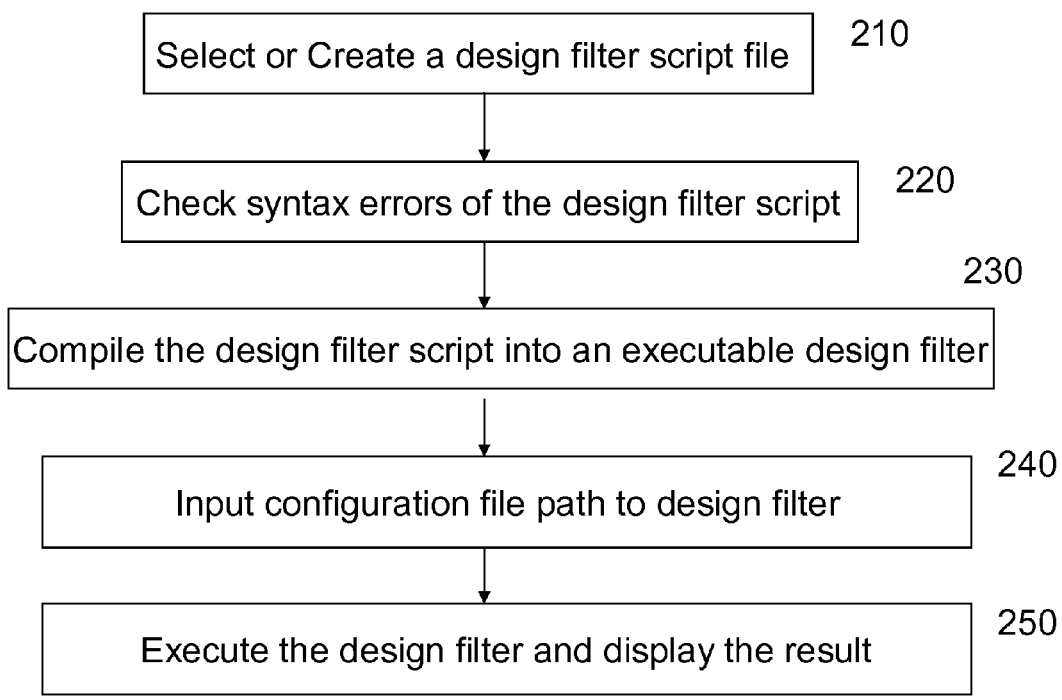
FIG. 3 is a logic flow diagram illustrating the main process for filtering a configuration file, in accordance with an exemplary embodiment of the present invention.

FIG. 3 is a logic flow diagram illustrating the main process for filtering a configuration file, in accordance with an exemplary embodiment of the present invention.

In step 210, the user either selects or creates a design filter to filter certain context of command lines from a configuration file. A design filter is initially entered by the user as a script file written in a specific language (described in detail below) and is later converted into an executable design filter, as discussed below. The syntax of the scripting language is similar to human language and is easy to learn and write. The language includes rules to define variables and syntax for the variable operations and also functions to parse command lines in the configuration file. If the user selects an existing design filter that is already in executable form, then process skips to step 240. Otherwise, the process continues with step 220.

In step 220, the design filter script is checked for any syntax error. Syntax errors may include such things as unknown or misspelled function names, incorrect function parameters, unrecognized variables or operators, and mismatched brackets or parentheses.

If no error occurs, the system compiles the design filter and translates it to an executable program in step 230. In typical embodiments, the executable program uses a common script language such as Perl or Python, although alternative embodiments may be converted into other executable forms. The original and/or compiled design filter may be stored in the system (e.g., in the network knowledge base 24) and may be shared with others over a communication network or otherwise. Thus, design filters may be written once but used multiple times.

In step 240, a configuration file path is provided as a parameter to the executable program. For example, the user may specify a configuration file path (e.g., to a configuration file stored in the network knowledge base 24) or may select a network device from which the configuration file is obtained.

In step 250, the system executes the program and displays the result. In an exemplary embodiment, the program is executed by the network manager 23 and the result is displayed to the user/client terminal 20 via the graphical user interface 22, typically along with the relevant network topology map.

Figure 4:
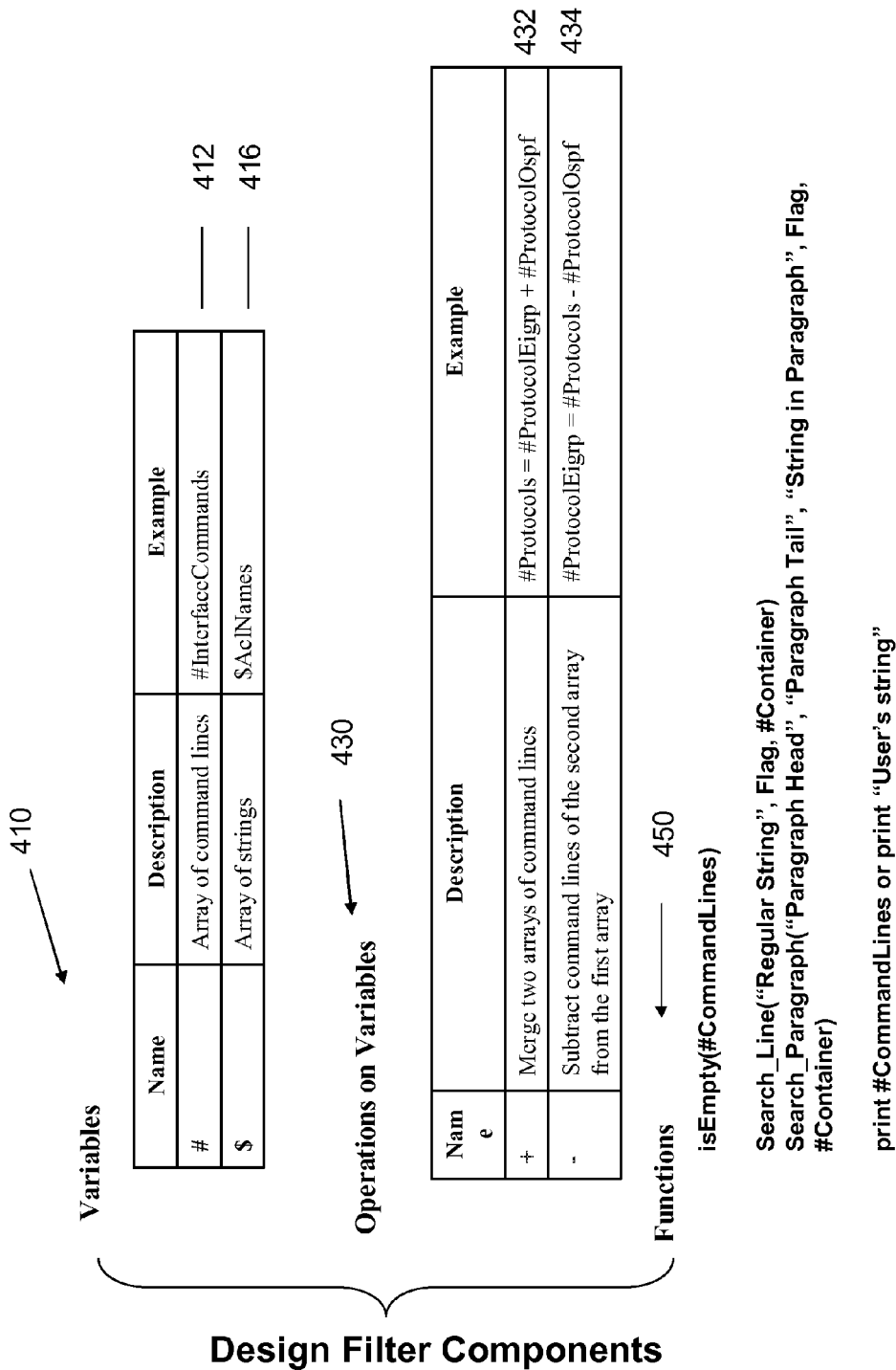
FIG. 4 shows the syntax or components for writing design filters, in accordance with an exemplary embodiment of the present invention.

FIG. 4 shows the syntax or components for writing design filters, in accordance with an exemplary embodiment of the present invention. Purposefully, the language syntax is simple and easy to learn and write. In this exemplary embodiment, the language syntax includes three components, namely variables, operations on variables, and functions. These components are described in greater detail below.

In this exemplary embodiment, there are two types of variables. Variables with name starting with "#" represent an array of command lines and variables with the name staring with "$" represent an array of strings. Paragraph and multiple lines of configurations can be contained in #variable. And a simple configuration line is treated as a special case of #variable: the array size is 1. $variable is used for, among other things, defining and outputting a string that is not in the configuration file.

In this exemplary embodiment, there are two operations on variables. The operation "+" (plus) merges two arrays of command lines into one array. For example, a variable #Protocols can be defined as including Eigrp protocols and Ospf protocols, e.g., #Protocols=#ProtocolEigrp+#ProtocolsOspf. The operation "−" (minus) subtracts the second command lines from the first command lines. For example, a variable #ProtocolsEigrp can be defined as all protocols minus Ospf protocols, e.g., #ProtocolEigrp=#Protocols−#ProtocolsOspf.

There are four functions, described generally in the following tables:

TABLE 1

Function isEmpty( )

| | |
|---|---|
| Function Name | isEmpty(#CommandLines) |
| Description | Judge whether #CommandLines is an empty array. Return true if it is an empty array. |
| Example | if (isEmpty(#HostName))<br>{<br>} |

TABLE 2

Function print( )

| | |
|---|---|
| Function Name | print #CommandLines or print $UserString |
| Description | Output the array of command lines or user defined string |
| Example | print "Below is interfaces' configuration with tag-switching ip command"<br>print #InterfacesWithTag |

TABLE 3

Function Search Line( )

| | |
|---|---|
| Function Name | Search_Line("Regular String", Flag, #Container) |
| Description | Search command line(s) matching the "Regular String" in #Container or in the entire configuration file if #Container is not specified |
| Example | Search_Line("^hostname ($HostName)", first);<br>Search_Line("^ip route", continuous, #CommandLineScope); |
| Parameters | Description |
| Regular String | Use this string to match command lines, for example,<br>➢ "^hostname" means matching a command line begins with string "hostname".<br>➢ "ip access-group ($ACLName)" means matching a command line with string "ip access-group", also access-list name in this command line is set to the array of $ACLName.<br>➢ "^access-list $ACLName" means matching a command line beginning with "access-list and also this command line must contain a value in the array $ACLName. |
| Flag | Flag has two options: First and All<br>➢ First: search the first command line matching the "Regular String" and stop.<br>➢ All, means searching all command lines matching the "Regular String" |
| #Container | #Container is a scope of command lines which the result is searched from. If #container is not specified, the scope is all command lines in configuration file. |

TABLE 4

Function Search_Paragraph( )

| | |
|---|---|
| Function Name | Search_Paragraph("Paragraph Head", "Paragraph Tail", "String in Paragraph", Flag, #Container) |
| Description | Search paragraph(s) beginning with "Paragraph Head" and ending with "Paragraph Tail" if "Paragraph Tail" is specified. |
| Example | #InterfacesWithTag = Search Paragraph ("^interface", "", "tag-switching ip", all);<br>#MPLSBgp = Search_Paragraph ("address-family", "exit-address-family", "", all, #BgpConfiguration); |
| Parameters | Description |
| Paragraph Head | A regular string used to match the head line of a paragraph. This string must be specified, otherwise a syntax error occurs. |
| Paragraph Tail | A regular string used to match the end line of a paragraph. This string is optional. If this is not |

TABLE 4-continued

| Function Search_Paragraph( ) | |
|---|---|
| | specified, traditional definition of paragraphs will be used to judge the paragraph end. |
| String in Paragraph | If this is specified, then only a paragraph containing the "String in Paragraph" is matched. |
| Flag | See explanation of Flag in the function Search_Line |
| #Container | See explanation of Container in the function Search_Line |

In order to create a design filter to filter a configuration file, the system compiles or otherwise converts the design filter script into an executable design filter program. In one exemplary embodiment, the design filter is compiled into a Perl script program. The system basically goes through each line of design filter and translates each line of design filter into Perl format.

Figure 5:
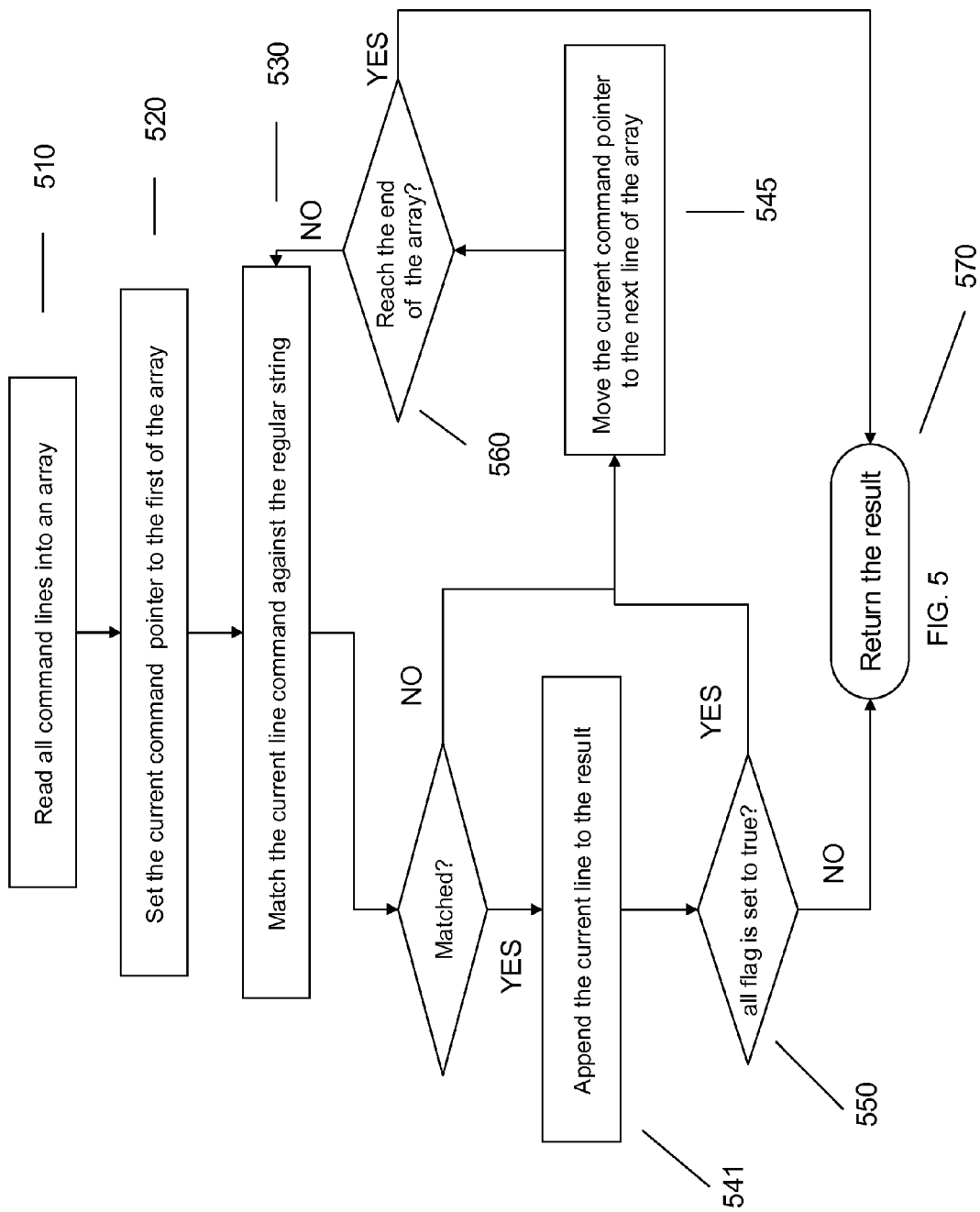
FIG. 5 is a logic flow diagram for the function Search_Line, in accordance with an exemplary embodiment of the present invention.

FIG. 5 is a logic flow diagram for the function Search_Line, in accordance with an exemplary embodiment of the present invention. At this exemplary embodiment, it is assumed that #Container is not set and so all command lines in configuration file will be searched to match the regular string specified in first parameter (see Table 3). At step 510, all command lines for the whole input configuration files are read and stored into the command line array in the memory. At the step 520, a programming parameter, the current command pointer is initialized as the first line of the array. At step 530, the system matches the current line command against the regular string specified in the first parameter of this function. Depending on whether the current line matches the regular string, the system goes to step 541 or 545. If the current line command is matched, then the current line is appended to the result at Step 541. Otherwise, the system moves the current command pointer to the next command line in the array at Step 545. At step 550, the flag is checked: if the flag is set be all, then the system will go to step 545 to continue search. Otherwise, the function exits and returns the result. At step 560, the system checks whether the end of array is reached. If so the function exits and returns the result. Otherwise, it goes on to step 530.

The following is exemplary pseudocode for function Search_Line in accordance with an exemplary embodiment of the present invention. The parameters are regExp, flag, and optionally container. The variable CommandLines[ ] is defined as an array of string. The variable results[ ] is defined as an array of string. The variable currentLine is defined as a string. The variable lineIndex is defined as an integer.

Figure 6:
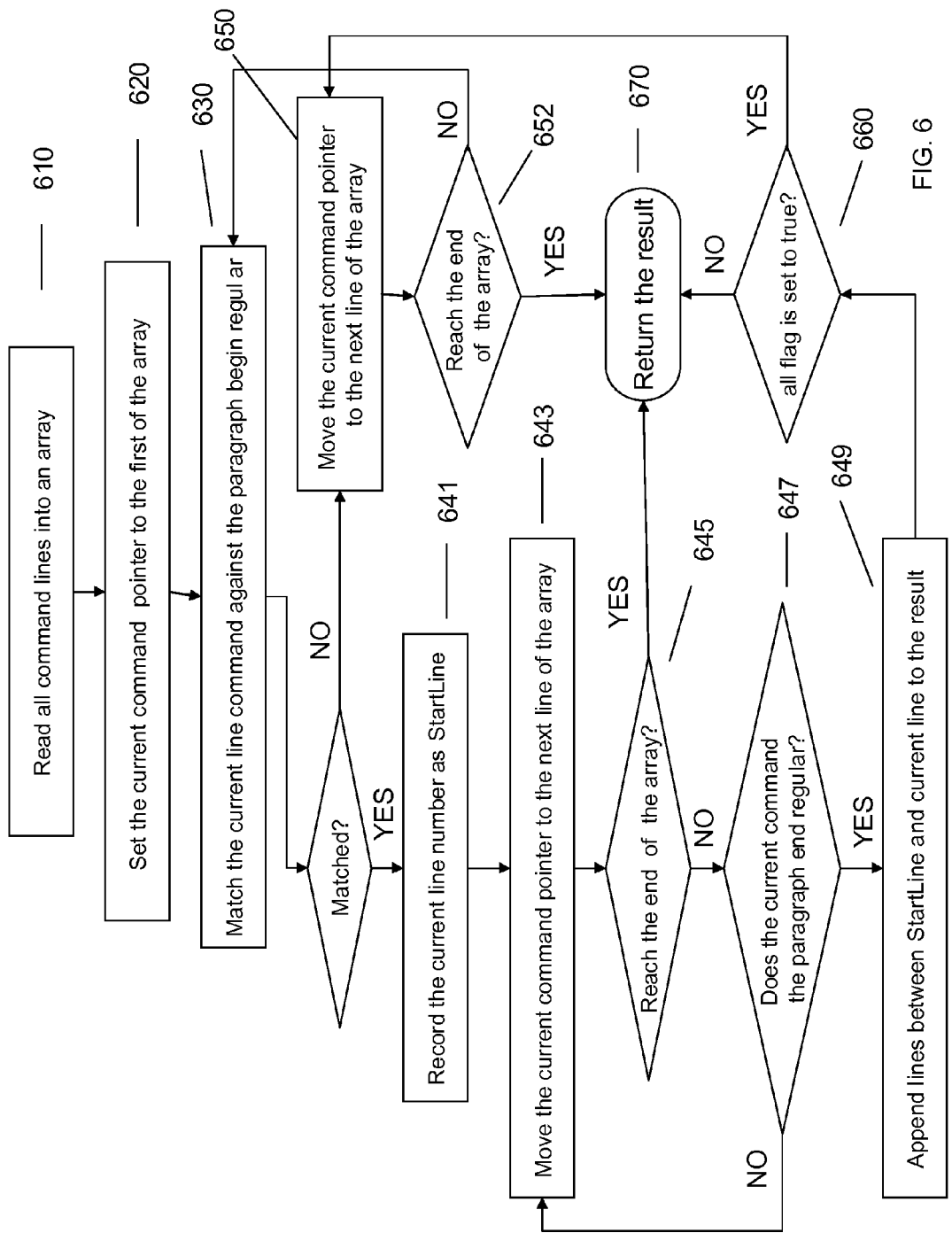
FIG. 6 is a logic flow diagram for the function Search_Paragraph, in accordance with an exemplary embodiment of the present invention.

Read configuration file or container line-by-line into CommandLines;
Set lineIndex to 0;
While (lineIndex <length of CommandLines)
Set currentLine to be CommandLines[lineIndex];
If currentLine matches regExp
Then
   Add currentLine to results[ ];
   If flag is set to be first
      Then return results;
   Else /*flag is set to all so need to continue*/
      Increase lineIndex by 1;
Else /*currentLine does not match regExp*/
   Increase lineIndex by 1;
Endwhile
Return results;

FIG. 6 is a logic flow diagram for the function Search_Paragraph, in accordance with an exemplary embodiment of the present invention. Again, in this exemplary embodiment, it is assumed that #Container is not set and so all command lines in configuration file will be searched to find paragraphs beginning with "Paragraph Head" and ending with "Paragraph Tail" if "Paragraph Tail" is specified (see Table 4). At step 610, all command lines for the whole input configuration files are read and stored into the command line array in the memory. At the step 620, a programming parameter, the current command pointer is initialized as the first line of the array. At step 630, the system matches the current line command against the paragraph head regular string specified in the first parameter of this function. If it is matched, then system will go through steps from 641 to 649 to find all command lines between the paragraph head and paragraph tail. Otherwise, the system moves the current command pointer to the next command line in the array at Step 650 and checks whether the end of command lines are reached at step 652. If not, then the system goes to Step 630 to continue searching. At step 660, the system checks whether the flag is set to all. If so, then the system will go to Step 650 to continue searching; otherwise the function returns.

The following is exemplary pseudocode for function Search_Paragraph in accordance with an exemplary embodiment of the present invention. The parameters are (parameter beginRegExp, parameter endRegExp, parameter flag). The variable CommandLines[ ] is defined as an array of string. The variable results[ ] is defined as an array of string. The variable currentLine is defined as a string. The variable lineIndex is defined as an integer. The variable startLineIndex is defined as an integer.

Read configuration file or container line-by-line into CommandLines;
Set lineIndex to 0;
While (lineIndex <length of CommandLines)
Set currentLine to be CommandLines[lineIndex];
If currentLine matches beginRegExp
Then
   Set startLineIndex as lineIndex;
   Do {
      Increase lineIndex by 1;
      Set currentLine to be CommandLines[lineIndex];
   } while (currentLine does not match endRegExp)
   Add CommandLines between startLineIndex and currentLine to results;
   If flag is set to be first
      Then return results;
   Else /*flag is set to all so that we need look recursively*/
      Increase lineIndex by 1;
Else /*currentLine does not match beginRegExp*/
   Increase lineIndex by 1;
Endwhile
Return results;

In various alternative embodiments, the "Flag" parameter may include a third option ("Continuous") to search for continuous lines or paragraphs meeting the specified criteria (i.e., after finding the first line or paragraph meeting the specified criteria, continue searching until a line or paragraph is reached that does not meet the specified criteria). The following is exemplary pseudocode for the function SearchLine including a "continuous" option. Here, an additional variable "found" is defined.

Read configuration file or container line-by-line into CommandLines;
Set lineIndex to 0;
Set found=FALSE;
While (lineIndex <length of CommandLines)
Set currentLine to be CommandLines[lineIndex];

If currentLine matches regExp
Then
   Add currentLine to results[ ];
   Set found=TRUE;
   If flag is set to be first
      Then return results;
   Else /*flag is not set to first so need to continue*/
      Increase lineIndex by 1;
Else /*currentLine does not match regExp*/
   If found=TRUE and flag is set to be continuous
      Then return results;
   Else /*either not found or flag is set to be all*/
      Increase lineIndex by 1;
Endwhile
Return results;

It should be noted that a particular pseudocode line may itself represent a series of actual operations. For example, determining whether currentLine matches regExp may involve stepping through currentLine to perform character-by-character comparisons with the search criteria.

Similarly, the "+" and "−" operators may represent a series of operations. For example, a script line that reads:
   #result4=#result3±#result2
may be replaced with a program code segment represented by the following pseudocode:
   For each line in result3[ ]
      Add line to result4[ ];
   Endfor
   For each line in result2[ ]
      Add line to result4[ ];
   Endfor Similarly, returning results may involve copying the contents of the results variable to a user-specified variable or may be a logical operation in that the variable referred to as "results" is replaced with the user-specified variable. Thus, for example, a script line that reads:
   #result2=Search_Line("^network", first, #result1)
may be replaced with a program code segment represented by the following pseudocode:
   Read result1[ ] line-by-line into CommandLines;
   Set lineIndex to 0;
   While (lineIndex <length of CommandLines)
      Set currentLine to be CommandLines[lineIndex];
      If currentLine matches "^network"
      Then
         Add currentLine to result2[ ];
         Break;
      Else /*currentLine does not match regExp*/
         Increase lineIndex by 1;
   Endwhile In this way, the variable result2[ ] already includes the results when the execution is completed such that the "return results" is a logical operation.

In essence, then, converting the design filter script into an executable design filter involves replacing each line in the script with a corresponding program code segment, including any user-specified variables and operators. Using the design filter script shown in FIG. 8a as an example (this figure is discussed in more detail below), the conversion process for this design script operates generally as follows:

Define variables result1[ ], result2[ ], result3[ ], result4[ ] as arrays of string
   Replace line 310 with Search_Paragraph program code segment
   Replace line 320 with Search_Line program code segment
   Replace line 330 with Search_Line program code segment
   Replace line 340 with appropriate program code segment
   Replace line 350 with print program code segment Simply by way of example, lines 330 and 340 may be replaced with program code segments represented by the following pseudocode:
LINE 330:
   Read result1[ ] line-by-line into CommandLines;
   Set lineIndex to 0;
   While (lineIndex <length of CommandLines)
      Set currentLine to be CommandLines[lineIndex];
      If currentLine matches "^router eigrp"
      Then
         Add currentLine to result3[ ];
         Increase lineIndex by 1;
      Else /*currentLine does not match regExp*/
         Increase lineIndex by 1;
   Endwhile
LINE 340:
   For each line in result3[ ]
      Add line to result4[ ];
   Endfor
   For each line in result2[ ]
      Add line to result4[ ];
   Endfor It should be noted that a program code segment does not necessarily need to include all of the conditional logic constructs. For example, in the pseudocode used above to describe the Search_Line function, there is conditional logic (e.g., if flag=first then do X else do Y), but the script specifies which condition is being invoked for a particular instance of the function, so the logic associated with other conditions may be omitted. In the example given immediately above, the converter "knows" that the script has the flag parameter set to "all," so it can omit the logic constructs associated with the "first" option. If the Search_Line function is used elsewhere in the script with the "first" option, then that instance of the Search_Line function may be replaced with a program code segment that omits the logic constructs associated with the "all" option, e.g., as shown above in the example of converting #result2=Search_Line("^network", first, #result1).

After the design filter script has been converted, the resulting program code can be compiled into an executable form or, if converted into an executable form such as an interpreted program, run by an interpreter.

Figure 7:
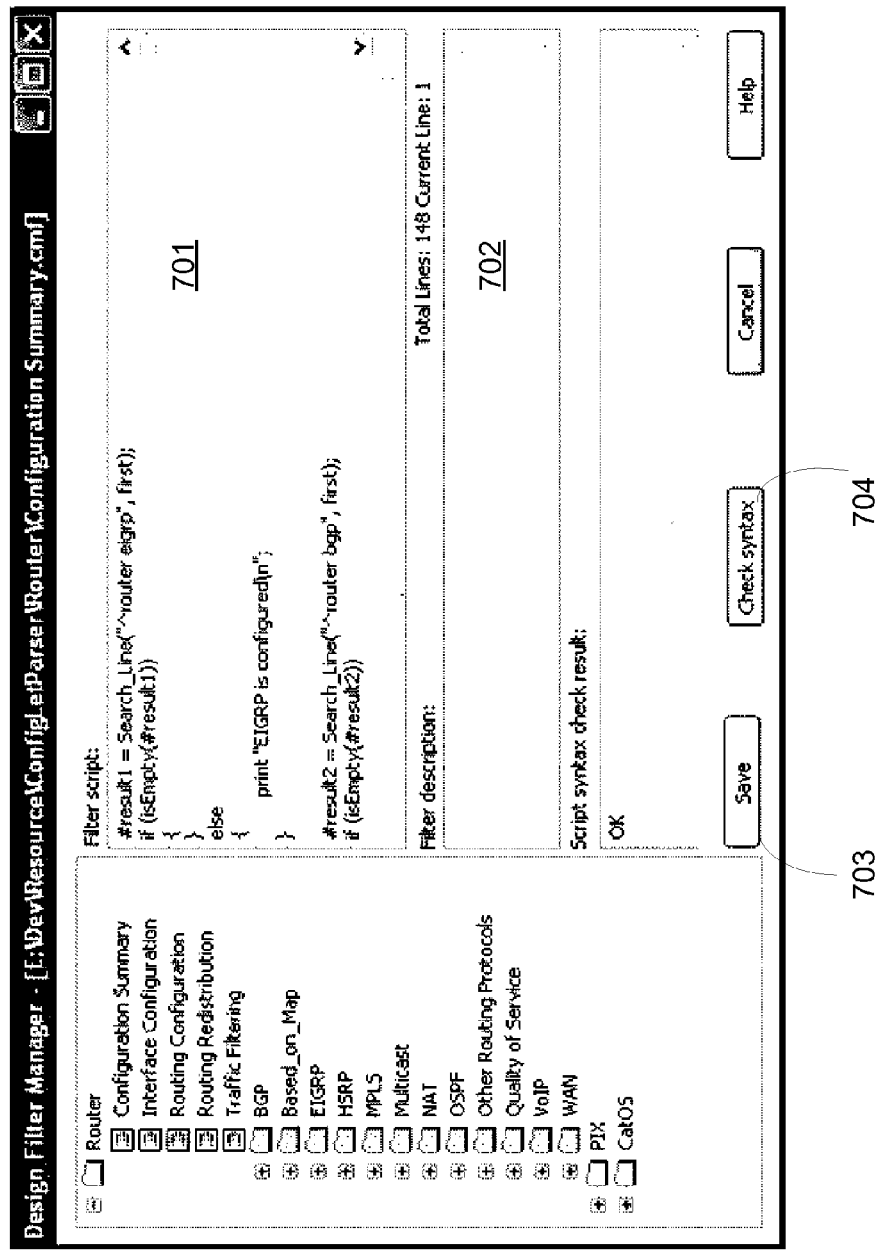
FIG. 7 shows a sample input screen for creating a design filter, in accordance with an exemplary embodiment of the present invention.

FIG. 7 shows a sample input screen for creating a design filter, in accordance with an exemplary embodiment of the present invention. Among other things, the input screen includes a window 701 where the user enters the design filter script and a window 702 where the user enters a design filter description. After entering the design filter script in window 701, the user can select the "Check syntax" button 703 to check the syntax of the design filter. As discussed above, syntax errors may include such things as unknown or misspelled function names, incorrect function parameters, unrecognized variables or operators, and mismatched brackets or parentheses. The user may also select the "Save" button 704 to compile and save the design filter.

Figures 8A, 8B:
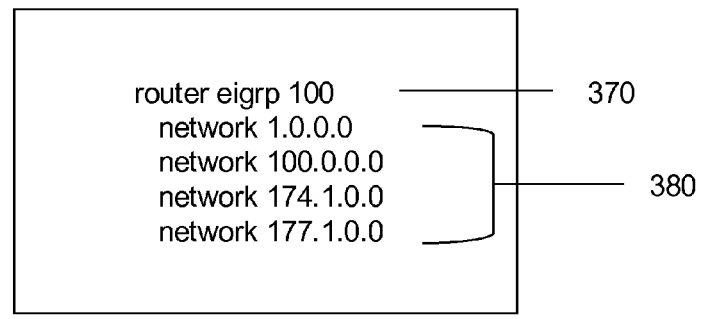
FIGS. 8a and 8b respectively show a sample design filter and corresponding results for displaying EIGRP routers and their corresponding networks in the configuration file shown in FIG. 2, in accordance with an exemplary embodiment of the present invention.

FIG. 8a shows a sample design filter for displaying EIGRP routers and their corresponding networks in the configuration file shown in FIG. 2, in accordance with an exemplary embodiment of the present invention. At Line 310, the function Search_Paragraph is called to find all paragraphs staring with the text string "router eigrp" and containing the text string "network." The last parameter "all" is a flag meaning that all paragraphs should be found instead of just finding the first paragraph. Applying this function to the configuration file shown in FIG. 2 results in the variable #result1 as follows:
   router eigrp 100 network 1.0.0.0
network 100.0.0.0
network 174.1.0.0
network 177.1.0.0
no auto-summary In other words, Line 310 locates, and sets the variable #result1 to, paragraph 120 shown in FIG. 2.

Line 320 calls the function Search_Line to search for, and set the variable #result2 to, all lines in #result1 starting with "network." Thus, variable #result2 is set to:
network 1.0.0.0
network 100.0.0.0
network 174.1.0.0
network 177.1.0.0

Line 330 calls the function Search_Line to search for, and set the variable #result3 to, all lines in #result1 starting with "router eigrp." Thus, variable #result3 is set to:
router eigrp 100

Line 340 merges #result3 and #result2 into #result4, and line 350 displays #result4 as shown in FIG. 8b (line 370 is #result3 and lines 380 are #result2).

FIG. 9 shows a sample design filter for showing traffic filtering commands applied to an interface in the configuration file shown in FIG. 2, in accordance with an exemplary embodiment of the present invention. At Line 902, the function Search_Paragraph is called to find all paragraphs staring with the text string "interface" and containing the text string "ip access-group. The last parameter "all" is a flag meaning that all paragraphs should be found instead of just finding the first paragraph. Applying this function to the configuration file shown in FIG. 2 results in the variable #result1 as follows:
interface Ethernet0
ip address 174.1.1.2 255.255.255.0
ip access-group 1 in Line 904 calls the function Search_Line to search for, and set the variable #InterfaceCmd to, all lines in #result1 starting with "interface." Thus, variable #InterfaceCmd is set to:
interface Ethernet0

Line 906 calls the function Search_Line to search for, and set the variable #AccessGroup to, all lines in #result1 starting with "ip access-group" while also compiling a list of group numbers in the array variable $acl. Thus, variable #AccessGroup is set to:
ip access-group 1 in
Array variable $acl is set to [1].

Line 908 calls the function Search_Line to search for, and set the variable #result2 to, continuous lines in the configuration file starting with "access-list 1." Thus, variable #result2 is set to:
access-list 1 permit 177.1.9.1
access-list 1 permit 177.1.8.1

Line 910 calls the function Search_Paragraph to search for, and set the variable #result3 to, the first paragraph in the configuration file starting with "ip access-list." Thus, variable #result3 is null.

Line 912 merges #InterfaceCmd and #AccessGroup into #result4. Thus, #result4 is set to:
interface Ethernet0
ip access-group 1 in Lines 914, 916, and 918 respectively print #result4 followed by #result2 followed by #result3, as follows:
interface Ethernet0
ip access-group 1 in
access-list 1 permit 177.1.9.1
access-list 1 permit 177.1.8.1

Figure 10:
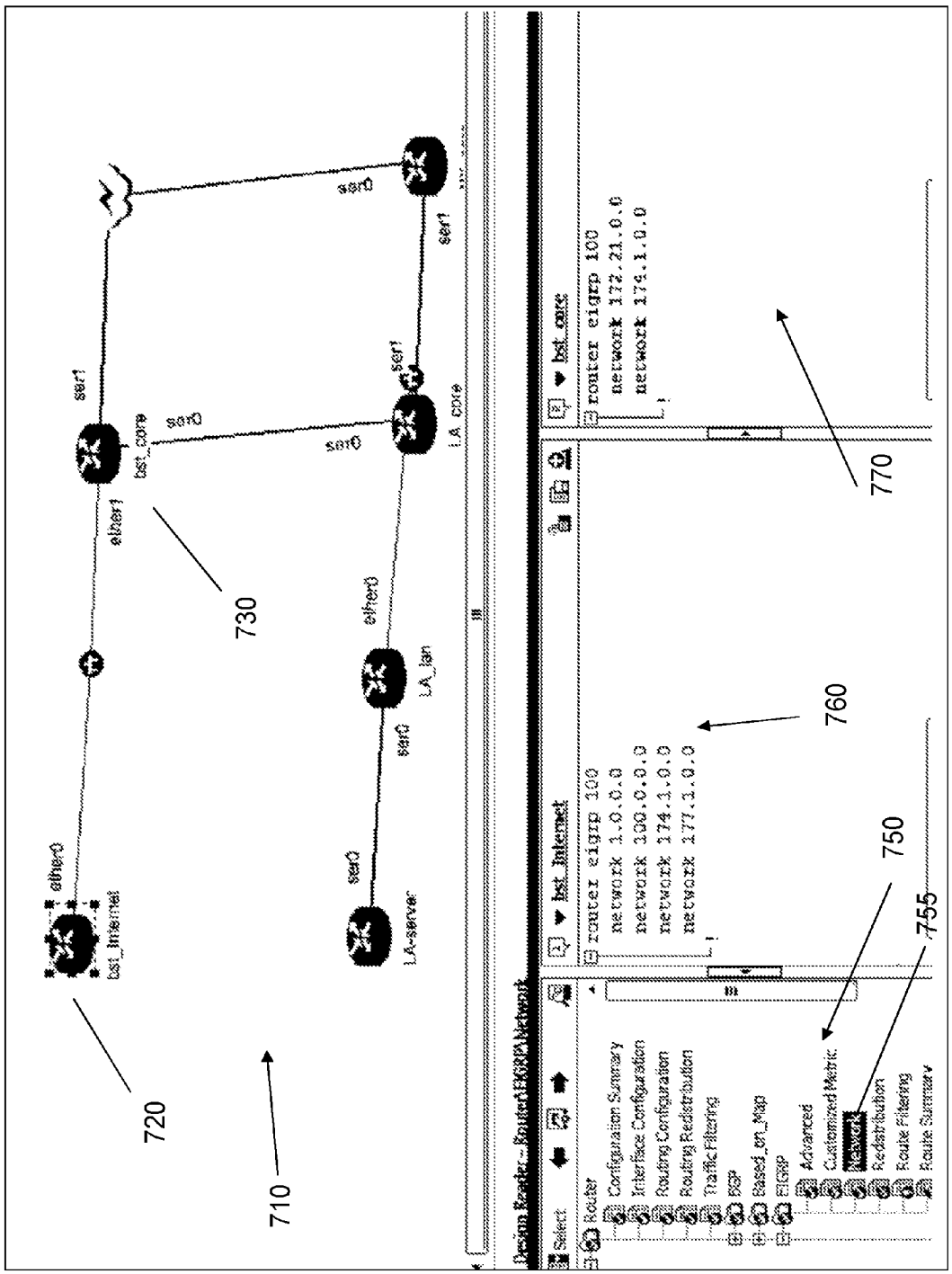
FIG. 10 shows a sample screen including sample design filter results for two selected network devices, in accordance with an exemplary embodiment of the present invention.

FIG. 10 shows a sample screen including sample design filter results for two selected network devices, in accordance with an exemplary embodiment of the present invention. In this screen, the network professional can select a design filter from the panel 750 and can also select one or more network devices from network topology map 710 on which to apply the selected design filter. In this exemplary embodiment, each design filter in panel 750 belongs to a catalog representing a network field and has a unique name. From the network topology map 710, the network professional can select the network device(s) of interest in one of three ways, specifically (1) by selecting a specific network device, e.g., router 720 or 725; (2) by selecting a specific LAN or WAN segment including the network device(s) of interest, e.g., selecting LAN 730 in order to select routers 720 and 725 or selecting WAN 735 in order to select the routers connected to the WAN; or (3) by selecting a serial link, e.g., selecting serial link 740 in order to select the routers linked by the serial link. Alternatively, the user may be permitted to invoke the selected design filter with a specified configuration file path (e.g., ShowEigrpCommand "E:\Conf\Ny_Core.rack").

In this exemplary embodiment, the user has selected a design filter 755 named "Network" under the catalog of "EIGRP," which is similar to the design filter shown in FIG. 8a used to parse all network commands covered by the EIGRP routing protocol. The user also has selected router 720, as indicated by the box depicted around the router icon. In response to these selections, the network manager 23 obtains the configuration files for router 720 and neighbor router 725 (e.g., from the network knowledge base 24 or from the routers themselves), runs the selected design filter on the two configuration files (e.g., by invoking the design filter with the configuration file path), and displays the filtered results for routers 720 and 725 in panels 760 and 770, respectively. Showing the filtered results for two routers side-by-side can be very useful for the network professional, particularly where a network technology such as a dynamic routing protocol can refer to the configuration of other routers in the network. It should be noted that embodiments may display filtered results, for one, two, or more network devices at a time.

It should be noted that alternative embodiments of the present invention may provide additional and/or different functions for processing configuration files, using a similar or different syntax to that described above. Reports produced by design filters may be output in different forms, such as, for example, displayed on a computer monitor or other display device (e.g., on user/client terminal 20), spooled to a printer, stored in a tangible computer readable medium, or transmitted over a communication network (e.g., via electronic mail or otherwise).

It should be noted that a different design filters may be applied to a given network device configuration file, for example, to view different types of information at different times and/or in different contexts.

One exemplary embodiment of the present invention is the NetBrain Workstation™ Edition 2.3.J network management product, and specifically the Design Reader component, sold by NetBrain Technologies Inc. of Burlington, Mass. This product is described generally in associated user documentation from NetBrain Technologies, Inc.; this user documentation is hereby incorporated herein by reference in its entirety for all purposes. A copy of Section 7 of the user documentation is included as Appendix A, which is expressly incorporated herein physically and by reference.

It should be noted that the pseudocode included above is used to describe the general functionality of various functions and operations in accordance with exemplary embodiments and does not necessarily represent the actual logic constructs and logic flow of specific implementations.

It should be noted that terms such as "client," "server," "switch," and "router" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A method of filtering network device configuration files by a network management system, the method comprising:
    storing a set of design filters in a storage device by providing at least one input screen via a graphical user interface; receiving a design filter script via the at least one input screen, wherein the design filter script includes primitives for searching lines and paragraphs in the network device configuration files having specified attributes; converting the design filter script into an executable design filter, the executable design filter configured to implement the searching when executed; and storing at least one of the design filter script or the executable design filter in the storage device;
    receiving, via the graphical user interface, user input identifying a selected design filter from among the set of design filters and selecting a plurality of network device configuration files;
    applying the selected design filter to the plurality of selected network device configuration files to produce filtered results including filtered results for the plurality of network device configuration files; and
    providing the filtered results via the graphical user interface for display on a user display device, the filtered results provided via a screen having at least two windows arranged side-by-side within the screen, wherein each window includes the filtered results associated with one of the plurality of network device configuration files, the filtered results displayed as at least one of individual commands or command lines from the plurality of network device configuration files.

2. A method according to claim 1, wherein applying the selected design filter comprises:
    retrieving a network device configuration file from the storage device; and
    applying the selected design filter to the retrieved network device configuration file.

3. A method according to claim 1, wherein applying the selected design filter comprises:
    transmitting a request to a network device;
    receiving a network device configuration file from the network device in response to the request; and
    applying the selected design filter to the received network device configuration file.

4. A method according to claim 3, wherein the request includes a command line interface (CLI) command, and wherein the request is transmitted via a network interface.

5. A method according to claim 1, wherein providing the filtered results comprises:
    providing a screen including the filtered results and a graphical representation of at least one network element associated with the filtered results.

6. A method according to claim 1 wherein the design filter script is converted into Perl.

7. A method according to claim 1 wherein applying the selected design filter comprises:
    applying the executable design filter to the plurality of network device configuration files.

8. A method according to claim 1, wherein the user input selecting the plurality of network device configuration files includes a path associated with a stored network device configuration file.

9. A method according to claim 1, wherein the user input selecting the plurality of network device configuration files includes selection of a network element from among a set of network elements presented via the graphical user interface.

10. A method according to claim 9, wherein the network element represents a network device having an associated network device configuration file, and wherein the selected design filter is applied to such associated network device configuration file.

11. A method according to claim 9, wherein the network element represents a logical component having a number of associated network devices, each network device having an associated network device configuration file, and wherein the selected design filter is applied to each of such associated network device configuration files.

12. A network management system employing at least one hardware processor comprising:
    a network manager including the at least one hardware processor;
    a storage device in which the network manager stores a set of design filters;
    a graphical user interface through which users interact with the network manager; and
    a network interface through which the network manager obtains information about network devices;
    the network manager configured to store the set of design filters in the storage device by providing at least one input screen via the graphical user interface; receiving a design filter script via the at least one input screen, wherein the design filter script includes primitives for searching lines and paragraphs in the network device configuration files having specified attributes; converting the design filter script into an executable design filter, the executable design filter configured to implement the searching when executed; and storing at least one of the design filter script or the executable design filter in the storage device;
    the network manager further configured to receive, via the graphical user interface, user input identifying a selected design filter from among the set of design filters and selecting a plurality of network device configuration files;
    the network manager further configured to apply the selected design filter to the plurality of selected network device configuration files to produce filtered results, including the filtered results for the plurality of network device configuration files; and
    the network manager further configured to provide the filtered results via the graphical user interface for display on a user display device, the filtered results provided via a screen having at least two windows arranged side-by-side within the screen, each window including the filtered results associated with one of the plurality of network device configuration files, the filtered results displayed as at least one of individual commands or command lines from the plurality of network device configuration files.

13. A network management system according to claim 12, wherein the network manager is configured to apply the selected design filter by retrieving a network device configuration file from the storage device and applying the selected design filter to the retrieved network device configuration file.

14. A network management system according to claim 12, wherein the network manager is configured to apply the selected design filter by transmitting a request to a network device; receiving a network device configuration file from the network device in response to the request; and applying the selected design filter to the received network device configuration file.

15. A network management system according to claim 14, wherein the request includes a command line interface (CLI) command, and wherein the request is transmitted via a network interface.

16. A network management system according to claim 12, wherein the network manager is configured to provide the filtered results by providing a screen including the filtered results and a graphical representation of at least one network element associated with the filtered results.

17. A network management system according to claim 12, wherein the design filter script is converted into Perl.

18. A network management system according to claim 12, wherein the network manager is configured to apply the selected design filter by applying the executable design filter to the plurality of network device configuration files.

19. A network management system according to claim 12, wherein the user input selecting the plurality of network device configuration files includes a path associated with a stored network device configuration file.

20. A network management system according to claim 12, wherein the user input selecting the plurality of network device configuration files includes selection of a network element from among a set of network elements presented via the graphical user interface.

21. A network management system according to claim 20, wherein the network element represents a network device having an associated network device configuration file, and wherein the network manager is configured to apply the selected design filter to such associated network device configuration file.

22. A network management system according to claim 20, wherein the network element represents a logical component having a number of associated network devices, each network device having an associated network device configuration file, and wherein the network manager is configured to apply the selected design filter to each of such associated network device configuration files.

23. A method of filtering network device configuration files by a network management system, the method comprising:
    storing a plurality of design filters in a storage device, the design filters specifying different filtering criteria;
    receiving, via a graphical user interface, a first user input identifying a first design filter from among the plurality of design filters;
    applying the first design filter to a network device configuration file to produce first filtered results;
    providing the first filtered results via the graphical user interface for display on a user display device;
    receiving, via the graphical user interface, a second user input identifying a second design filter from among the plurality of design filters;
    applying the second design filter to the network device configuration file to produce second filtered results; and
    providing the second filtered results via the graphical user interface for display on the user display device,
    wherein storing the plurality of design filters in the storage device comprises providing at least one input screen via the graphical user interface; receiving a design filter script via the at least one input screen, wherein the design filter script includes primitives for searching lines and paragraphs in the network device configuration files having specified attributes; converting the design filter script into an executable design filter, the executable design filter configured to implement the searching when executed; and storing at least one of the design filter script or the executable design filter in the storage device; and
    wherein providing the first and second filtered results via the graphical user interface includes providing the first and second filtered results via a screen having at least two windows arranged side-by-side within the screen, each window including one of the first and second filtered results associated with the plurality of network device configuration files, the first and second filtered results displayed as at least one of individual commands or command lines from the network device configuration file.

24. Apparatus comprising a tangible, non-transitory computer-readable medium having embodied therein a computer program for filtering network device configuration files in a network management system, the computer program including instructions that, when run on a computer processor of the network management system, causes the computer processor to perform processes comprising:
    storing a set of design filters in a storage device by providing at least one input screen via a graphical user interface; receiving a design filter script via the at least one input screen, wherein the design filter script includes primitives for searching lines and paragraphs in the network device configuration files having specified attributes; converting the design filter script into an executable design filter, the executable design filter configured to implement the searching when executed; and storing at least one of the design filter script and the executable design filter in the storage device;
    receiving, via the graphical user interface, user input identifying a selected design filter from among the set of design filters and selecting a plurality of network device configuration files;
    applying the selected design filter to the plurality of selected network device configuration files to produce filtered results including filtered results for the plurality of network device configuration files; and
    providing the filtered results via the graphical user interface for display on a user display device, the filtered results provided via a screen having at least two windows arranged side-by-side within the screen, each window including the filtered results associated with one of the plurality of network device configuration files, the filtered results being displayed as at least one of individual commands or command lines from the plurality of network device configuration files.

* * * * *